United States Patent [19]
Kohaut

[11] 3,972,579
[45] Aug. 3, 1976

[54] ELECTRICAL INSERT DEVICE
[75] Inventor: John E. Kohaut, West Orange, N.J.
[73] Assignee: Raceway Components, Inc., Linden, N.J.
[22] Filed: Sept. 3, 1974
[21] Appl. No.: 502,284

[52] U.S. Cl. .................................. 339/34; 339/44 R
[51] Int. Cl.² .................. H01R 13/44; H01R 13/60
[58] Field of Search ................... 339/34, 36, 37, 39, 339/43, 44, 75 P, 76–79, 103 B, 103 C

[56] References Cited
UNITED STATES PATENTS

| | | | |
|---|---|---|---|
| 690,155 | 12/1901 | King | 339/44 R X |
| 2,415,602 | 2/1947 | Monaco | 339/75 P |
| 3,189,862 | 6/1965 | Vleerick et al. | 339/34 |
| 3,622,684 | 11/1971 | Press | 339/34 X |

FOREIGN PATENTS OR APPLICATIONS
658,303    3/1938    Germany .............................. 339/39

Primary Examiner—Joseph H. McGlynn
Assistant Examiner—Craig R. Feinberg
Attorney, Agent, or Firm—Sommers & Sommers

[57] ABSTRACT

An electrical insert housing device provided with novel means for controlled movement of an electrical receptacle member thereof with respect to a floor or other surface, enabling elevation of the electrical receptacle to upright position for exposure thereof and access thereto for connection of accessory cables therewith and retraction of the receptacle to closed position inwardly of the insert housing, protected from extraneous exposure and contact.

2 Claims, 4 Drawing Figures

ELECTRICAL INSERT DEVICE

BACKGROUND OF THE INVENTION

Receptacle devices have heretofore been provided with means for mounting the receptacle directly to a surface with resultant continuing exposure of the plug and cord.

This invention relates to an electrical insert device incorporating novel features including fixtures in an arrangement such that the electrical fixture is normally disposed within the insert housing, protecting the fixture and cable connection from exposure, and may be readily moved to a second position at which the cable connection may be readily made and separated in a safe and simple fashion; the electrical fixture may then be simply returned to enclosed position within the closed insert housing device.

The insert housing device of this invention may be used for connection of telephone, electric power and other signal devices, the electric fixture portion thereof enabling plugs to be connected to the fixture without the use of screws or mechanical attachments and without necessitating the use of tools to make or break the connection. The device further incorporates the provision of a grommet which may be flush mounted with the top of the insert housing device, which, in turn, may be flush mounted with the floor or other surface structure in which the housing device is positioned. The insert housing device may be prewired at the factory or other place of manufacture, for insertion into an opening of a structure, such as, for example, a floor opening wherein the device may be connected to wires or cables and used as a preset or afterset device.

It is among the further objects of this invention to provide novel means for incorporating a controlled movable electrical receptacle in an insert housing device in an arrangement enabling selective access thereto and retraction thereof into the housing, by the user, in a simple and safe manner.

The foregoing and other objects, which will become apparent from the ensuing specification, are achieved, in accordance with the present invention, by novel structural and operating features, described below, such that the receptacle may be movably mounted and guided in movement thereof with increased efficiency, dependability and reliability.

BRIEF DESCRIPTION OF THE DRAWINGS

The invention is diagramatically illustrated, by way of example, in the appended drawings, wherein similar reference characters indicate like parts and wherein.

DESCRIPTION OF THE PREFERRED ENBODIMENT

Figure 1:
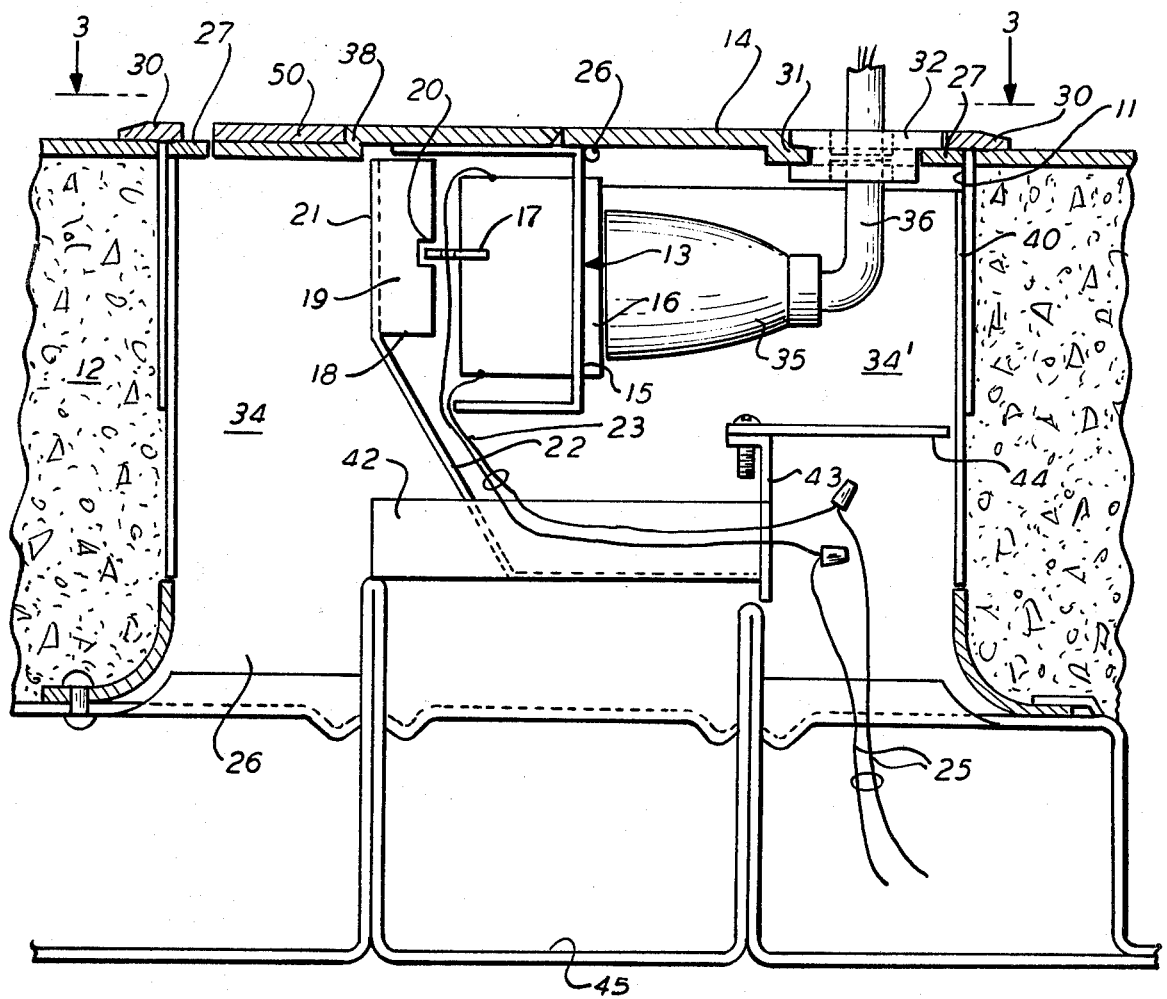
FIG. 1 is a vertical elevational, partly sectional, view of an electrical insert device embodying the invention, shown in closed position.
Figure 2:
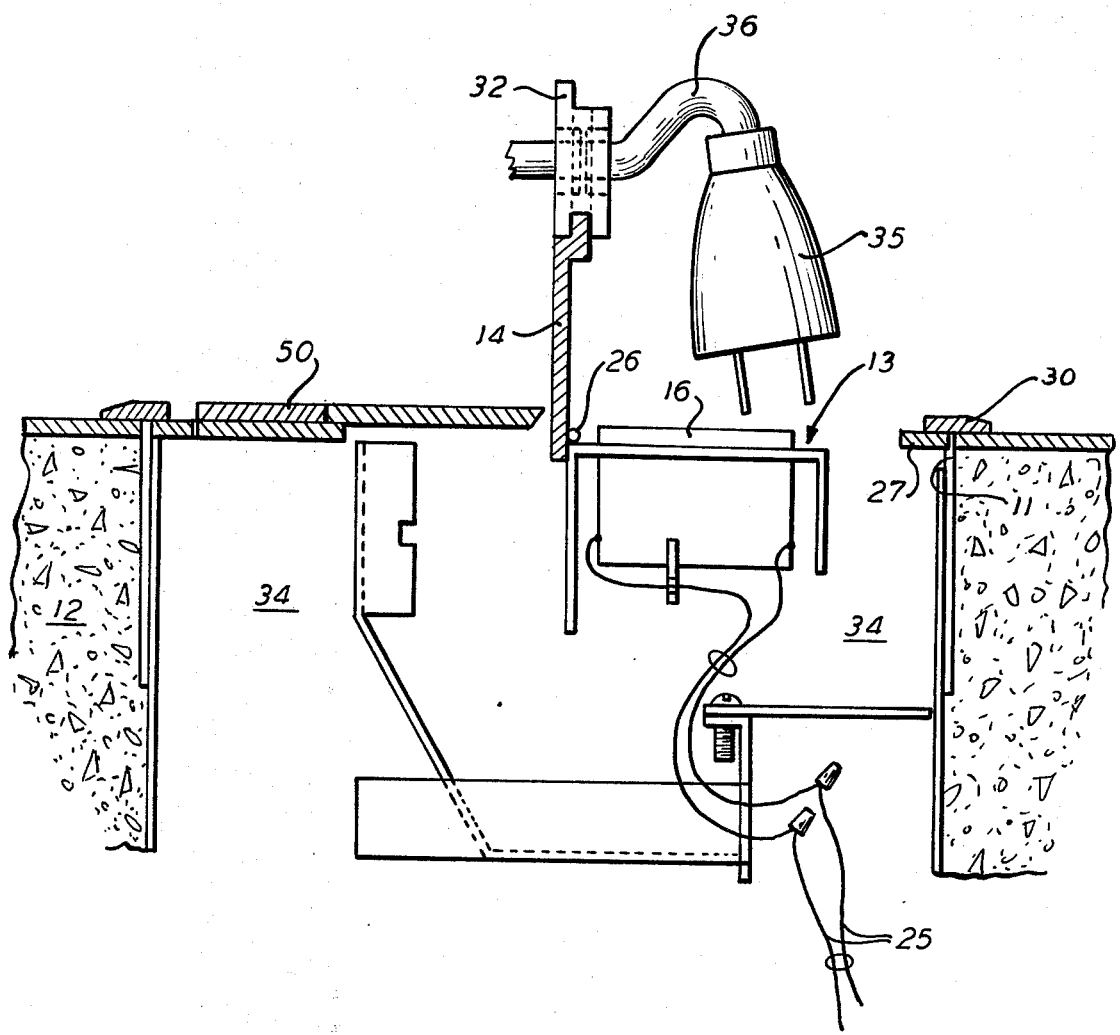
FIG. 2 is a similar view thereof, but showing the mounting plate elevated for connection of cable plugs to the electrical fixture in the insert housing.
Figure 3:
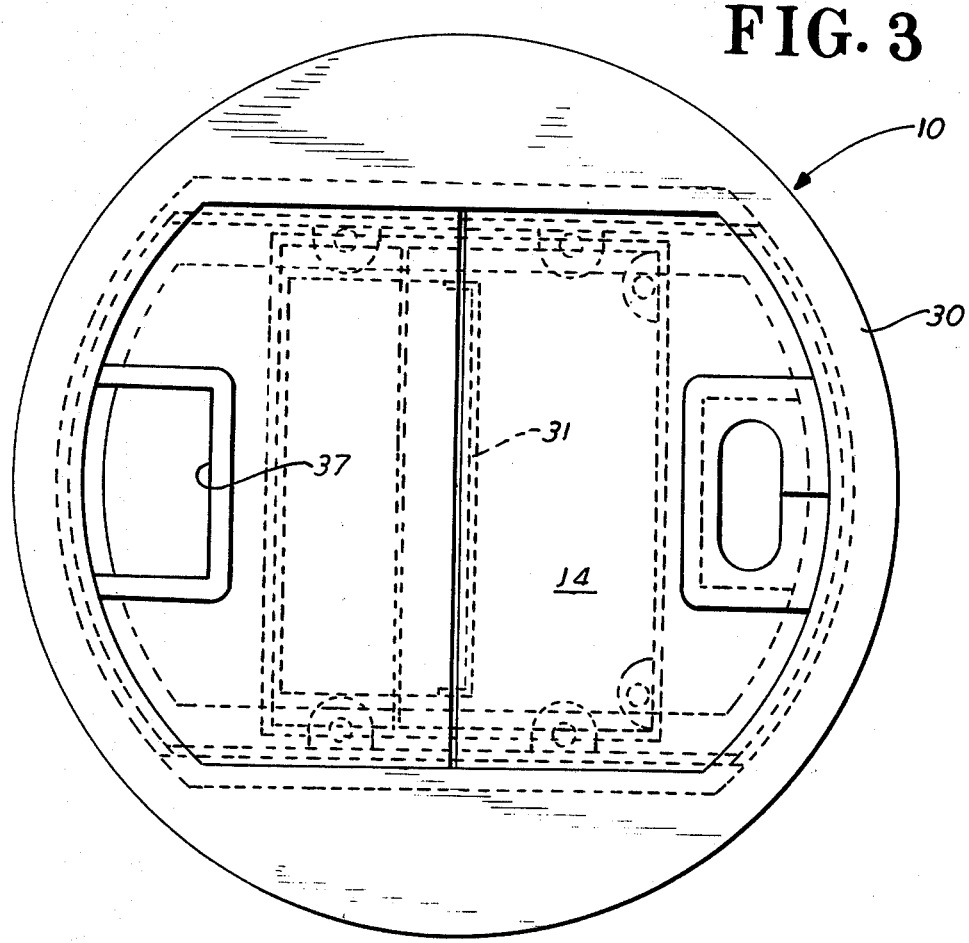
FIG. 3 is a top plan view taken at line 3—3 of FIG. 1.
Figure 4:
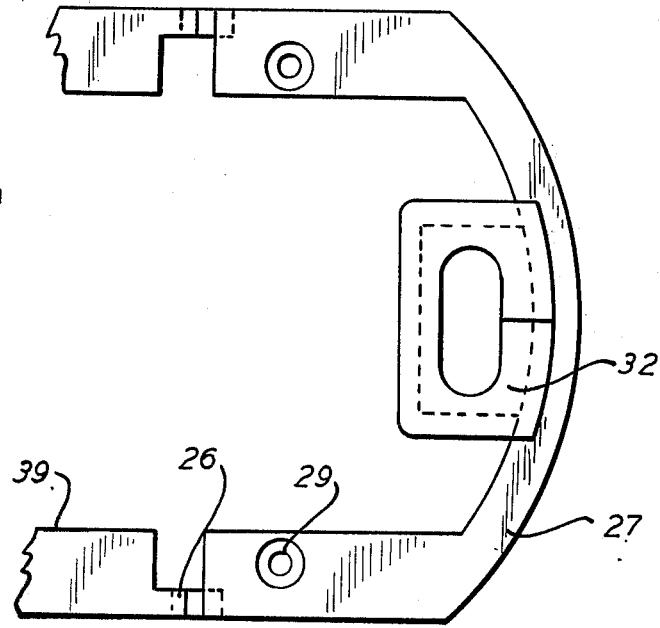
FIG. 4 is a fragmentary, top plan view, of a form of upper mounting plate which may be used in connection therewith.

In accordance with the preferred mode of practicing the invention, the electrical housing 10 of the invention is adapted (FIG. 1) to be disposed in an opening 11 for reception of said housing substantially flush with the top of structure 12, such as a building floor or the like in which the housing device 10 is so positioned. Pursuant to the invention, a first plate 14 is provided with means connecting said first plate flush with the top of the insert housing (FIGS. 1, 3). A plate 15 is secured to and depends from the first plate 14 angularly, (FIGS. 1, 2) so that, when said first plate 14 is disposed flush with the top of the insert housing (FIG. 1) the depending plate 15 will be disposed within the housing. Said depending plate 15 is adapted to support an electrical fixture 16, which may be provided with registration means 17 for complementary registration with the recess 20 of the means 18 in the housing device 10, such as a registration block plate 19 so recessed at 20. Barrier plate 21 is secured interiorly of the housing and divides and isolates the housing device into separate cable receiving areas 34, 34'. The cable means 23 may (FIG. 1) be prewired at the factory or other point of assembly of the electric housing device and may be spliced at the point of installation, as shown in FIG. 1, to the cable source 25. Pursuant to the arrangement described the cable 23 is effectively isolated by the barrier 21 from the remainder of the insert device, the remainder including, for example, a telephone area 34 for the reception of the telephone cable through opening 26 isolated from cable 23 by barrier 21. The receptacle fixture 13 may be movably disposed in the electric housing device 10 by suitable means, for example, by providing a hinge connection 26 (FIG. 1) between plate 14 and (FIG. 4) fixture 13. A rim plate 27 and rim 30 may (FIGS. 1, 4) be secured to the structure 12 by any suitable means, for example, by bolt means 29 (FIG. 4). Plate 14 is preferably provided with an offset or undercut portion 31 (FIG. 1) for reception of the preferably split grommet 32. Pursuant to the invention, the first plate 14 of the electrical fixture 13 is lifted by grasping grommet 32 or the undercut portion 31 of the first plate 14 and moving said plate to the position shown in FIG. 2, thereby positioning the electric fixture 16 in an exposed horizontal plane (FIG. 2), facilitating connection of the plug end 35 of service cable 36 to said electric fixture receptacle 13. Then, by rotating the first plate 14 of the electric receptacle fixture 13 down to its normal (FIG. 1) position, the cable 36 and the associated parts and the receptacle fixture 13 and associated parts are concealed within the electric housing device. In the closed position of the parts (FIG. 1) the first plate 14 of the electrical fixture 16 and the top of the insert housing device, are disposed in line with the external rim 30 of said housing device; thus there are no protruding parts and likelihood of accidental contact with the electrical fixture 16 is obviated.

Further cables, such as, for example, telephone cables, may (FIG. 1) be passed through opening 26 in junction box 45 (FIG. 1) to the area 34 of the electrical insert housing device and through an opening 37 in (FIG. 3) the (second) cover plates 38, 50 for that portion of the opening 39 in the rim plate 27 (FIG. 4) not covered by the first plate 14 of the receptacle fixture 13.

The electrical insert housing device 10 includes the side wall 40 which encompasses not only the telephone area 34 and the electrical fixture area 34' but may also enclose further isolated signal or other areas, for other accessory cables. The barrier plate 21 may, as shown in FIG. 1, extend below the depending plate 16 of the electrical fixture, and a complementary barrier member 42 may be disposed in the insert housing to further isolate the receptacle fixture; said complementary barrier member may be adjustably disposed in the housing, for example, by securing it to a barrier plate 43 which, in turn, may be secured to a bracket plate 44 secured to or terminating adjacent the side wall 40 of housing device 10. One or both of the plates 43, 44 may be provided with openings for passage of additional or different cables. The device of the invention may thus serve the function of providing a convenient means for providing single or multiple cable service fixtures passing through a junction box 45 (FIG. 1) and connection thereof in the electrical insert housing device.

While the present invention has been particularly set forth in terms of specific embodiments thereof, it will be understood, in view of the instant disclosure, that numerous variations upon the invention will thereby be made apparent to those skilled in the art, which variations in propriety are within the scope of the instant teaching. Accordingly, the invention is to be broadly construed and limited only by the scope and spirit of the claims appended hereto.

I claim:
1. In an electrical insert device adapted to be disposed at an opening defined by rim means of a floor structure:
   a. a first plate having opposite ends,
   b. means pivotally connecting said first plate intermediate its ends to said insert device, whereby said first plate may be alternately rotated to close onto said rim means thereby closing said opening therein or to extend above said opening,
   c. a fixture support plate secured to said first plate and pivot means in angular relation thereto and so movable with the first plate on rotation thereof,
   d. an electric socket secured to said fixture support plate and so movable therewith,
   e. said electric socket being formed for complementary connection of a cable plug therewith,
   f. whereby the fixture support plate will be disposed inwardly of the floor opening when said first plate is closed onto said rim means and, when it is desired to connect a cable plug to the socket device, said first plate may be rotated to a position above said opening and said fixture support plate thereby rotated therewith to a position across the floor opening and said cable plug may be moved downwardly onto said fixture support plate and into connection with said socket device, and
   whereby the first plate and fixture support plate may then be rotated to dispose the first plate across said opening and onto said rim means and the fixture plate and cable plug so connected to the electric socket disposed in said opening below the overlying first plate.

2. In an electrical insert device as set forth in claim 1, a split grommet secured to an end of said first plate for facilitating insertion of the cable plug into and out of the split grommet to thereby connect and disconnect said cable plug and electric socket.

* * * * *